(12) United States Patent
Parizhsky et al.

(10) Patent No.: US 7,554,977 B2
(45) Date of Patent: Jun. 30, 2009

(54) METHOD AND APPARATUS FOR INDICATING PACKET BOUNDARIES IN FRAMES

(75) Inventors: Vladimir Parizhsky, New York, NY (US); Tom Richardson, South Orange, NJ (US); Junyi Li, Bedminster, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 1286 days.

(21) Appl. No.: 10/174,042

(22) Filed: Jun. 18, 2002

(65) Prior Publication Data

US 2002/0196751 A1 Dec. 26, 2002

Related U.S. Application Data

(60) Provisional application No. 60/299,833, filed on Jun. 21, 2001.

(51) Int. Cl.
*H04L 12/28* (2006.01)
*H04L 12/56* (2006.01)

(52) U.S. Cl. .................................................. 370/389

(58) Field of Classification Search ................ 370/528, 370/522, 470, 329, 395, 465, 252, 472, 474, 370/476, 389, 422, 218, 280, 360, 387, 388, 370/336, 498, 294, 236, 346; 709/203, 202, 709/236, 243, 223, 212; 341/51, 87; 710/22, 710/56; 798/203; 725/36; 375/300, 240; 714/751, 701, 702; 708/203; 711/1, 201, 711/144
See application file for complete search history.

(56) References Cited

U.S. PATENT DOCUMENTS

| | | | |
|---|---|---|---|
| 5,414,650 A * | 5/1995 | Hekhuis ..................... 708/203 |
| 5,452,288 A * | 9/1995 | Rahuel et al. ................ 370/203 |
| 5,600,366 A * | 2/1997 | Schulman ..................... 725/36 |
| 5,717,951 A * | 2/1998 | Yabumoto ..................... 710/11 |
| 5,767,912 A * | 6/1998 | Bunting et al. ......... 375/240.01 |
| 6,005,871 A | 12/1999 | Petersen et al. |
| 6,061,820 A * | 5/2000 | Nakakita et al. ............. 714/751 |
| 6,075,814 A * | 6/2000 | Yamano et al. .............. 375/222 |
| 6,108,336 A | 8/2000 | Duault et al. |
| 6,229,821 B1 | 5/2001 | Bharucha et al. |
| 6,741,552 B1 * | 5/2004 | McCrosky et al. ........... 370/218 |
| 7,024,616 B2 * | 4/2006 | Ohira et al. ................. 714/786 |
| 2003/0163619 A1 * | 8/2003 | Saito ........................... 710/56 |

OTHER PUBLICATIONS

International Search Report for International Application No. PCT/US02/1928I, Dated: Oct. 3, 2002, pp. 1-3.

* cited by examiner

*Primary Examiner*—Wing F Chan
*Assistant Examiner*—Prenell P Jones
(74) *Attorney, Agent, or Firm*—Michael P. Straub; James K. O'Hare (57) ABSTRACT

Frames including a packet boundary information field indicator and, optionally, packet boundary information field in addition to packet data are described. Methods and apparatus for generating and using such frames are also described. The packet boundary indicator indicates the presence or absence of at least one packet boundary information field in the frame. Frames with a payload that is fully occupied with data corresponding to a single packet do not include a packet boundary information field. The packet boundary information field indicates the location of a corresponding packet boundary and the type of boundary. One packet boundary information field is included in a frame for each boundary separating the data corresponding to different packets. By using packet boundary information fields to specify the location of packet boundaries, the need to parse an entire packet to identify the location of a packet boundary is avoided.

41 Claims, 6 Drawing Sheets

METHOD AND APPARATUS FOR INDICATING PACKET BOUNDARIES IN FRAMES

RELATED APPLICATIONS

This application claims the benefit of U.S. Provisional Application Ser. No. 60/299,833 filed Jun. 21, 2001.

FIELD OF THE INVENTION

The present invention is directed to methods and apparatus for communicating information and, more particularly, to methods and apparatus for generating and transmitting information including frames which include packet data.

BACKGROUND OF INVENTION

In a communication system, traffic and/or control data are often generated and transmitted in the form of packets. A packet may include several bytes of data each byte normally including a fixed number of bits. Frequently, the length of a packet may be variable, i.e., is not a fixed number. In many communication systems, data packets are transmitted over a communication channel as a stream of data bytes. Therefore, to ensure that a receiver gets and can identify the data packets in the correct format, a receiver needs to be able to identify the beginning and the end positions of a data packet in a byte stream.

One known method of indicating packet boundaries is to add a length field at the beginning of each packet, which indicates the length of the packet. The method works well in an error-free environment. However, in reality, an error may occur such that the receiver does not get the correct length information of a packet. In this case, the error may propagate through subsequent packets, as the receiver loses the packet length synchronization thereafter.

Another known method of identifying packets is to stuff a specific field at the beginning of each packet to indicate the beginning position. The stuffed field is known beforehand to both the transmitter and the receiver. In the case where the same field already exists in the original data packet, additional field stuffing is required to avoid mistaking them with the stuffed beginning indicator. The drawback of such a method is that the size of the stuffed packets is increased as compared to packets without such stuffing. Perhaps even more importantly, the receiver has to check every field in the received data stream to identify the stuffing in order to retrieve the original packet format. This may be computationally expensive.

While the known techniques for identifying packets are functional in many cases, there remains room for improvement. Given the amount of packetized data being transmitted on a regular basis, it can be appreciated that there is a need for improved, robust and efficient methods of indicating packet boundaries in a byte stream transmitted over a communication channel. With the increase in the use of layered protocol structures, it is desirable that at least some of the new packet identification methods be suitable for use by communication systems with layered protocol structures.

BRIEF DESCRIPTION OF THE FIGURES

FIG. 4, which comprises

FIG. 5, which comprises the combination of FIGS. 5A and 5B, shows frames generated according to a method of indicating packet boundaries in frames in accordance with the present invention.

FIG. 6, which comprises the combination of FIGS. 6A-6F, illustrates a series of frames carrying different numbers of packets in accordance with the present invention.

SUMMARY OF THE INVENTION

The present invention is directed to methods and apparatus for generating, transmitting, and using frames which include packet data. Frames may be either fixed or variable in length. Each frame normally includes at least some packet data. Packet data corresponding to a portion of a packet, an entire packet, or multiple packets may be included in a single frame. Packet boundaries correspond to the end of packet data corresponding to one packet and the start of padding data or packet data corresponding to another packet. Accordingly, the location of packet boundaries in a frame may be specified as either the location of the last bit of data corresponding to one packet or the location of the first bit of data corresponding to the next packet or padding data.

In accordance with the present invention frames are generated which include a packet boundary information field indicator and, optionally, a packet boundary information field in addition to packet data. The packet boundary information field indicator may be, e.g., a single bit, used to indicate the presence or absence of a packet boundary information field in the frame. Since frames that include packet boundaries will include at least one packet boundary information field, the packet boundary information field indictor is the same as a packet boundary indicator in the context of a frame generated in accordance with the present invention. Frames with a payload that is fully occupied with data corresponding to a single packet do not include a packet boundary information field.

The packet boundary information field indicates the location of a corresponding packet boundary and the type of boundary. One packet boundary information field is included in a frame for each boundary separating the data corresponding to different packets. By using packet boundary information fields to specify the location of packet boundaries, the need to parse an entire packet to identify the location of a packet boundary is avoided. In addition, a fair amount of error resiliency is introduced since the loss of one packet boundary information field will result in the loss of at most two packets.

To facilitate easy location of the packet boundary indicator, the indicator may be positioned within a frame at a fixed offset from the start of the frame. Packet boundary information fields may be located at the end of the frame for easy access. In one embodiment packet boundary information fields are nested in the case where a frame includes multiple packet boundaries. In one such embodiment, the outermost packet boundary information field corresponds to the first packet boundary in the frame, the next outermost packet boundary information field corresponds to the second packet boundary in the frame and so on.

In one embodiment, four types of packet boundaries are possible. In such an embodiment, each packet boundary information field includes a two bit packet boundary type indicator in addition to one or more bits used to specify the location of the packet boundary within the frame.

Apparatus for generating frames from packet data in accordance with the present invention include hardware, software and/or a combination of hardware and software to generate frames in accordance with the present invention. Software may include separate instructions for controlling a processor to perform each of various frame generation operations. Such frame generation operations include, for example incorporating: i) a packet boundary information indicator used to indicate the presence or absence of a packet boundary information field into a frame along with ii) data corresponding to at least a portion of a packet, and ii) one or more packet boundary information fields including the above discussed information.

Apparatus for processing frames generated in accordance with the present invention include software and/or hardware for examining the packet boundary information indicator included in a frame to determine whether a packet boundary information field is included in said frame; and for extracting said packet data from said frame as a function of the information included in said packet boundary information field of a received frame. An apparatus for processing frames also includes hardware and/or software for reconstructing one or more packets from packet data extracted from one or more frames of the present invention.

Both of the above described apparatus for generating and processing frames of the present invention may include circuitry for receiving and/or transmitting frames. Such circuitry may include, e.g., a wireless receiver and/or transmitter.

A communications system of the present invention may include multiple devices of the type described above with the devices exchanging frames generated in accordance with the present invention. As part of the generation and transmission processes frames generated in accordance with the present invention may be stored on a digital data storage device.

Numerous additional features, embodiments and benefits of the methods and apparatus of the present invention are discussed in detail in the description which follows.

DETAILED DESCRIPTION OF THE INVENTION

Figure 1:
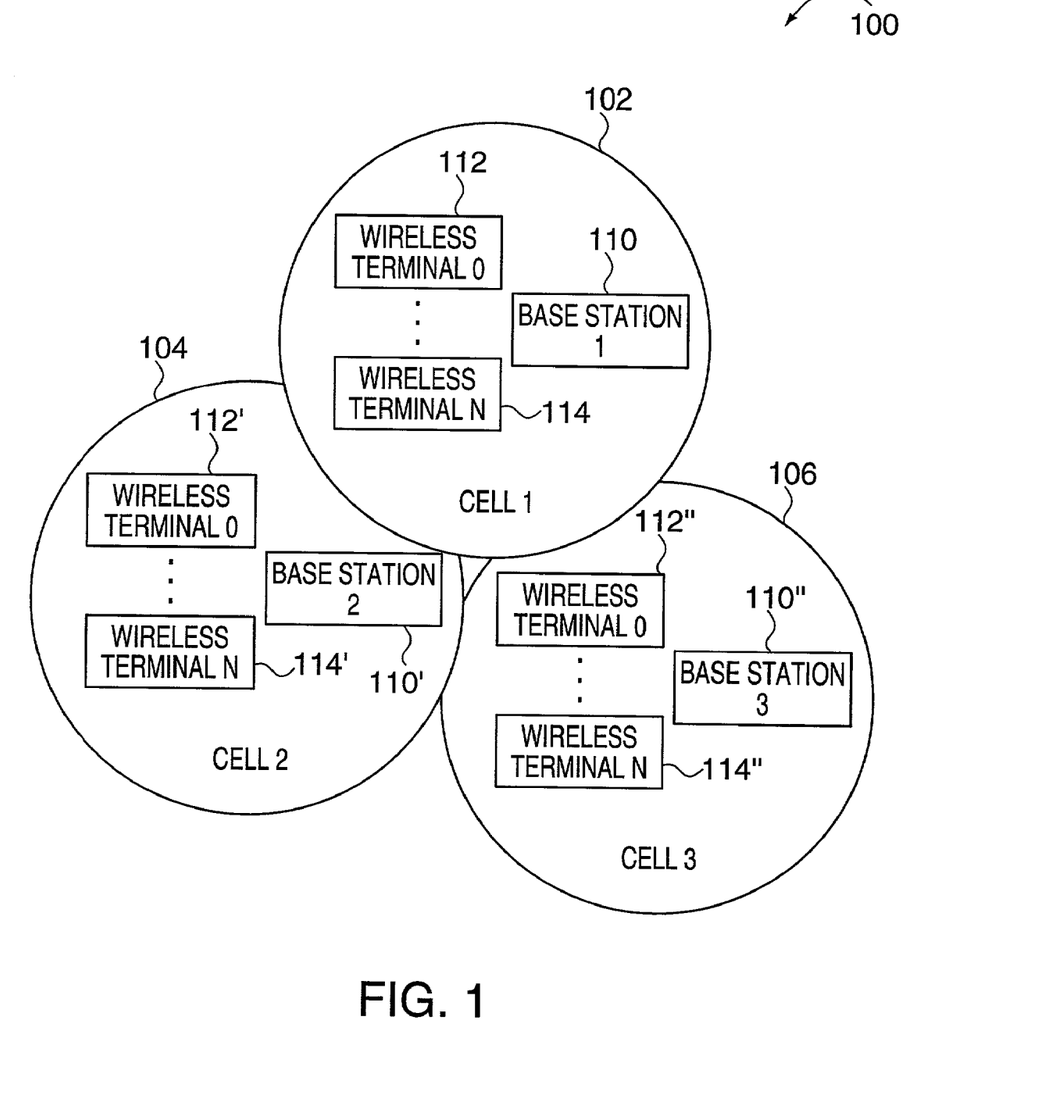
FIG. 1 illustrates a multi-cell communication system implemented in accordance with the invention.

FIG. 1 shows a communication system 100 implemented in accordance with the present invention including multiple cells 102, 104, 106. Each cell 102, 104, 106 includes a plurality of wireless terminals (112, 114), (112', 114') (112", 114") and a base station 110, 110', 110", respectively. Each wireless terminal includes a transmitter as well as a receiver. The wireless terminals may be mobile communications devices such as cell phones, personal data assistants with wireless modems, etc. Each base station 110, 110', 110" performs framing in accordance with the present invention. The wireless terminals use the framing method of the present invention to format and convert transmitted and received data. Note that neighboring cells 102, 104, 106 overlap slightly thereby providing the potential for signal collisions between signals being transmitted by wireless devices in neighboring cells. This can result in the loss of data, e.g., bytes, at a far greater rate than is encountered in the case of some other communications systems, e.g., fiber optic based systems.

Figure 2:
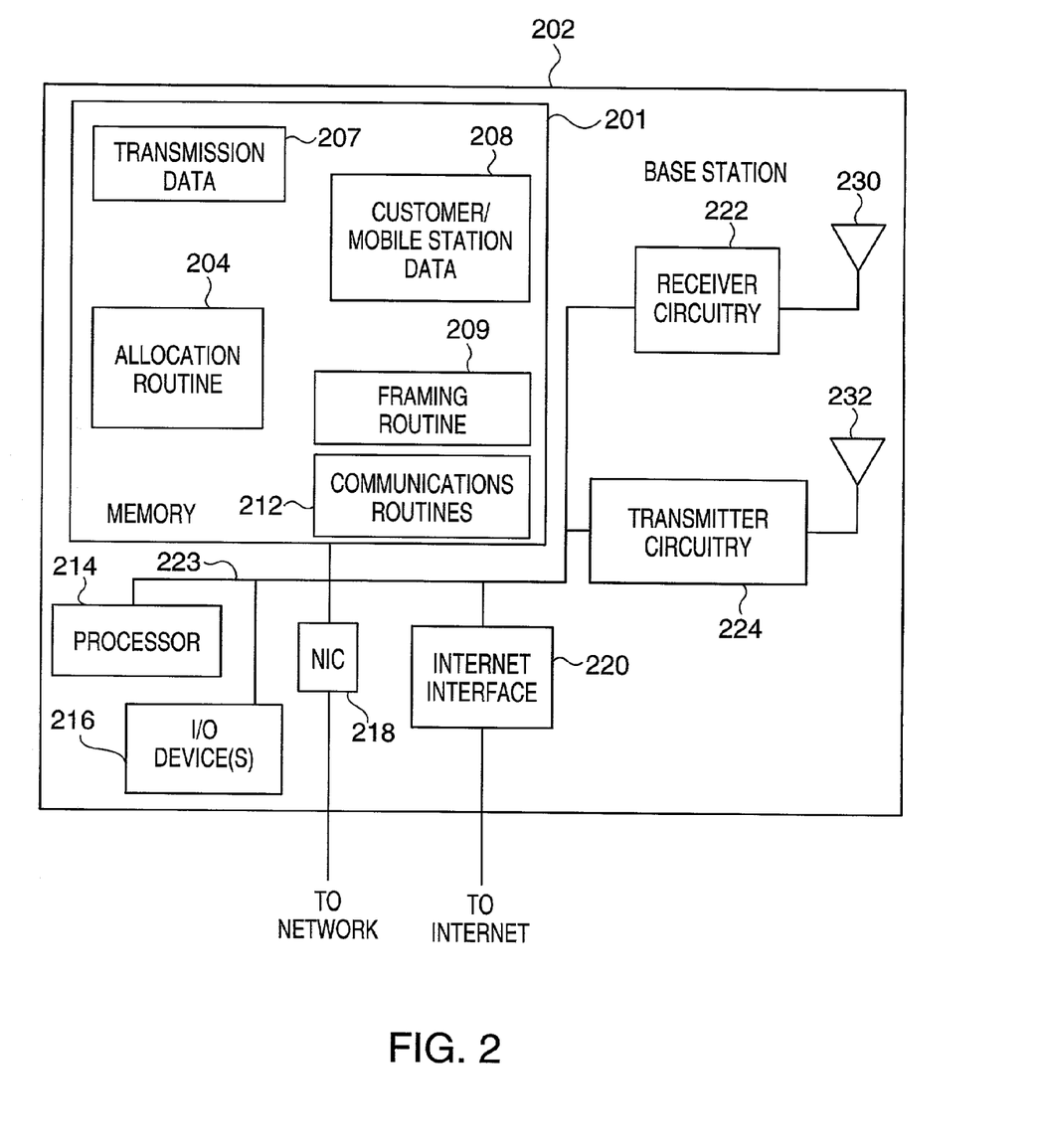
FIG. 2 illustrates a base station, suitable for use in the system of FIG. 1, which implements the framing method of the present invention.

FIG. 2 illustrates an exemplary base station 202. The base station 202 may be used as any one of the base stations 110, 110', 110" of the system 100. The base station 202 includes a processor 214, memory 201, input/output (I/O) device 216, network interface card 218, internet interface 220, a receiver circuit 222 and a transmitter circuit 224 which are coupled together by a bus 223.

The processor 214, maybe, e.g., a general purpose central processing unit (CPU). Processor 214 controls operation of the base station 202 under direction of one or more routines stored in memory 201. Memory 201 includes a framing routine 209, an allocation routine 204, communications routines 212, transmission data 207 and customer/mobile station data 208. The framing routine 209 frames the data packets to be output from the base station 202 to a wireless terminal 250 in accordance with the present invention, and converts frames received as input to the base station 202 into packets in accordance with the present invention. Allocation routine 204 is used to allocate tones for the transmission of data and signals to wireless terminals served by the base station 202. Communications routines 212 are responsible for controlling, when executed by the processor 214, the receipt, and transmission of data via receiver circuit 222 and transmitter circuit 224, respectively. Antennas 230, 232 are coupled to receiver circuit 222 and transmitter circuit 224, respectively, and are used for receiving and broadcasting data and other signals, respectively.

Customer/mobile station data 208 includes information such as the maximum number of wireless terminals which may be served by the base station 202, information identifying wireless terminals which are being serviced by the base station 202 at a particular point in time, the number of wireless terminals registered with the base station 202, a carrier frequency for receiving and/or transmitting data, the number of tones the carrier frequency is split into as well as other customer and/or wireless terminal related information. Transmission data 207 is data that is to be transmitted to wireless terminals, data received from wireless terminals and/or information relating to the transmission or receipt of data. Transmission data 207 includes packet data both prior and subsequent to operations performed in accordance with the framing method of the present invention.

NIC 218 provides an interface through which the base station 202 can connect to a network, e.g., a corporate LAN or WAN. Internet interface 220 serves as an interface to the Internet through which wireless terminals interacting with the base station 202 can send and receive data and perform other Internet access operations.

Figure 3:
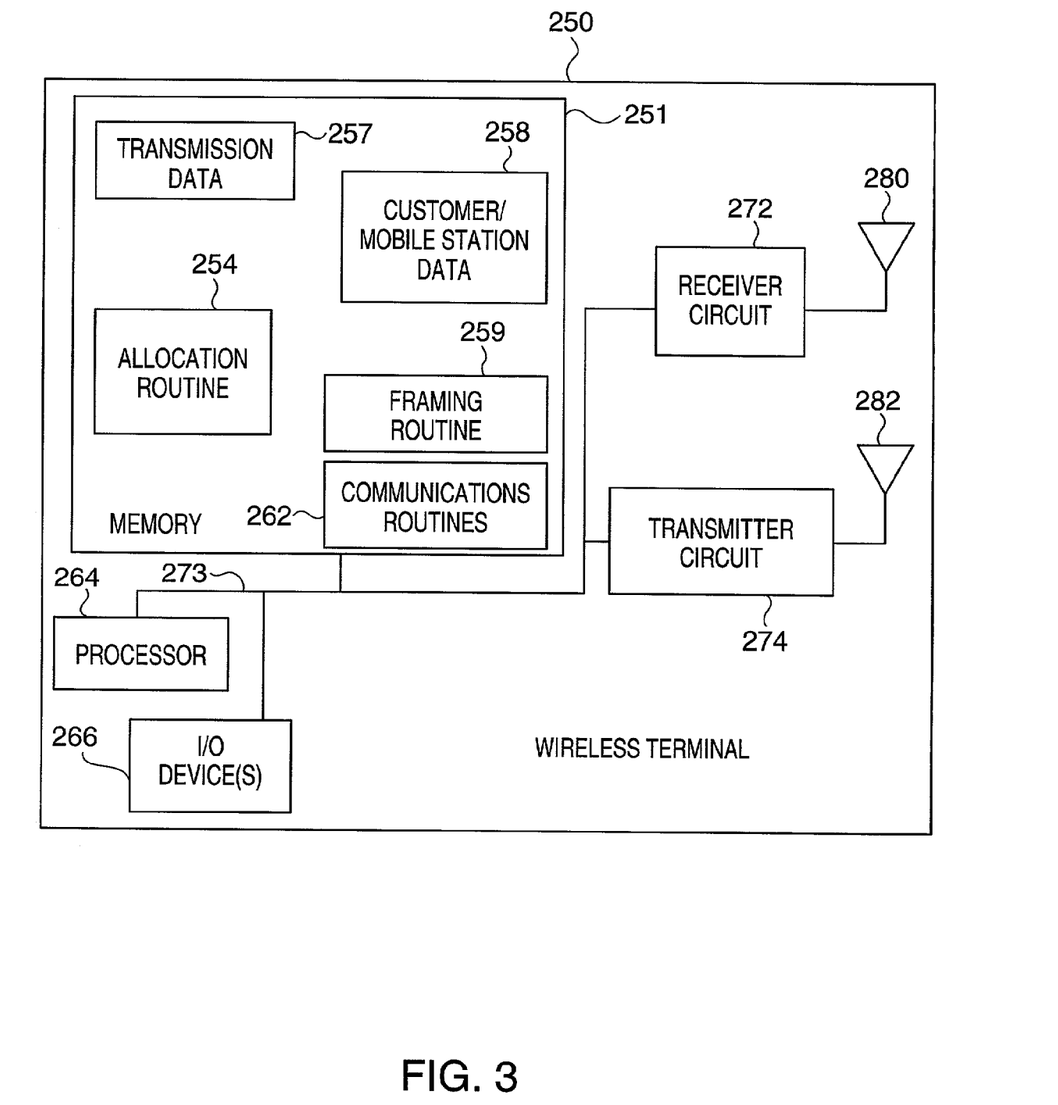
FIG. 3 illustrates a wireless terminal, suitable for use in the system of FIG. 1, which implements the framing method of the present invention.

FIG. 3 illustrates an exemplary wireless terminal 250 which can be used as any one of the wireless terminals of the system 100 shown in FIG. 1. The wireless terminal 250 includes a processor 264, memory 251, input/output (I/O) device 266, a receiver circuit 272 and a transmitter circuit 274 which are coupled together by a bus 273.

The processor 264, may be, e.g., a general purpose central processing unit (CPU). Processor 264 controls operation of the wireless terminal 250 under direction of one or more routines stored in memory 251. Memory 251 includes a framing routine 259, an allocation routine 254, communications routines 262, transmission data 257 and customer/mobile station data 258. The framing routine 259 frames the data packets to be output from the wireless terminal 250 to the base station 202 in accordance with the present invention, and converts frames received as input to the wireless terminal 250 into packets in accordance with the present invention. Wireless terminal allocation routine 254, when executed by processor 264, is used to determine when and on which tones the wireless terminal 250 is to transmit one or more signals to the base station with which the wireless terminal 250 is registered. The allocation routine 254 uses information received from the base station, to determine the tones on which it should transmit. Communications routines 262 are responsible for controlling, when executed by the processor 264, the receipt, and transmission of data via receiver circuit 272 and transmitter circuit 274, respectively. An antenna 280 used for receiving signals from a base station is coupled to receiver circuit 272. An antenna 282 used for transmitting signals, e.g., to base station 110, is coupled to transmitter circuit 274.

Customer/mobile station data 258 includes information identifying the wireless terminal 250, information identifying the base station 202 which is servicing wireless terminal 250 at a particular point in time, a carrier frequency for receiving transmitting data, the number of tones the carrier frequency is split into as well as other customer and/or wireless terminal/base station related information. Transmission data 257 is data that is to be transmitted to wireless terminals, data received from wireless terminals and/or information relating to the transmission or receipt of data. Transmission data 257 includes packet data both prior and subsequent to operations performed in accordance with the framing method of the present invention.

A layered structure is often used to organize various levels of protocols in communication systems. For example, the well-known Open System Interface (OSI) reference model specifies a seven-layer structure, which includes physical layer, data link layer, network layer, transport layer, session layer, presentation layer, and application layer, listed in the ascending order from the lowest protocol layer to the highest. In a layered protocol structure, data packets formed in one protocol layer are generally passed down to the low layer(s) for transmission.

For explanation purposes, the invention is described in the context of a communication system that uses the seven-layer OSI protocol structure. However, it is to be understood that the invention is applicable to communication systems with other layered protocol structures.

Figure 4A:
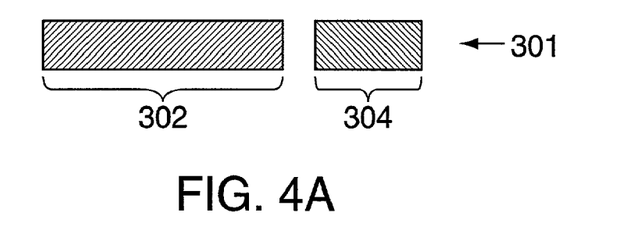
FIGS. 4A and 4B, illustrates the relationship between data packets and frames.
Figure 4B:
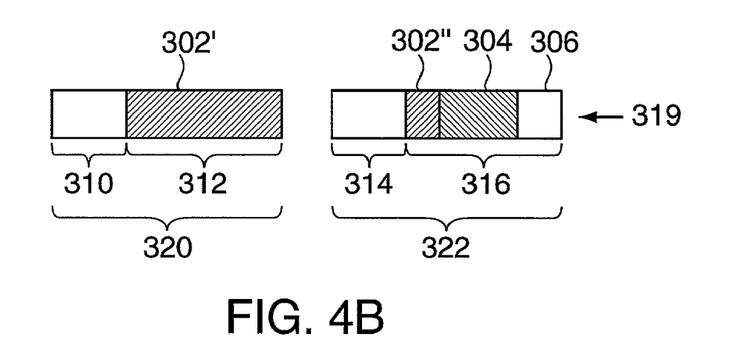

FIG. 4 illustrates the relationship between data packets between layers.

In FIG. 4 two data packets 301 (Packet A 302 and Packet B 304) are generated from an upper layer protocol. For example, those two packets 301 can be generated by Internet Protocol (IP) in the network layer (the upper layer), in which case they are IP packets. The two packets 301 are passed down to the data link layer. The data link layer fragments the two packets into two frames 319 which include Frame 1 320 and Frame 2 322.

As illustrated, each frame 320, 322 generally comprises an overhead portion 310, 314, and a body portion 312, 316, respectively. The body portion 312, 316 is also sometimes called a payload. The overhead portion 310 in frame 1 320 or 314 in Frame 2 322 includes a link layer header and/or tail, and typically conveys such information as the format of the frame, and a sequence number used by a receiver to reassemble the frames in order, if the frames are received out of sequence. The body portion 312 in Frame 1 320 or 316 in Frame 2 322 is used to carry the actual payload, e.g., the data packets, Packet A 302 and Packet B 304, that are passed down from the upper layer.

In FIG. 4, the two data packets 302,304 are carried by two link layer frames 320,322. The body portion 312 of the first frame 320 is completely filled by data bytes 302' of packet A 302. The body portion 316 of the second frame 322 is only partially filled by the remaining bytes 302" of packet A 302 and the entire packet B 304. The length of a frame is generally either fixed or chosen from a fixed set. Thus, in this example, the unfilled part 306 of the second frame 322 is padded to completely populate the frame. In order for the receiver to recognize the two original data packets 302 and 304, the transmitter has to indicate the boundaries of the packets 302, 304 in the frames 320, 322.

The link layer frames 320,322 are finally passed down to the physical layer, which transmits the data over the communication channel.

Figure 5A:
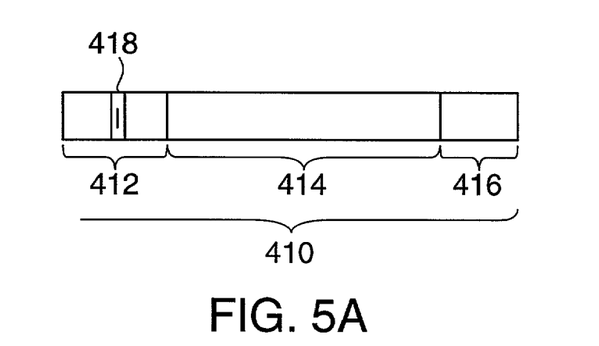
Figure 5B:
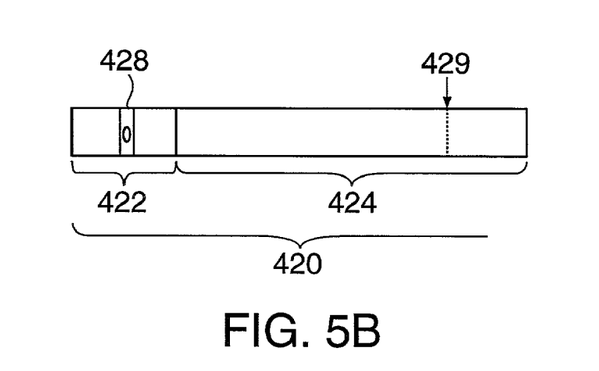

FIG. 5 shows frames generated according to a method of indicating packet boundaries in accordance with the invention. As discussed above, frames are generated and transmitted by the wireless terminals and base stations of the present invention under software control, for example, under control of framing routine 209 or 259.

Packet boundary information is indicated with a special field, called a bracket herein, which is included in the frames. A bracket may or may not be present in a given frame. Thus, in each frame a bracket indicator is included. The bracket indicator is a packet boundary information field indicator. In one embodiment, the packet indicator is, a one-bit flag in the overhead portion that is used to indicate the presence or absence of a bracket in the frame. The one-bit flag is thus called the bracket indicator bit. In the exemplary embodiment when the bracket indicator bit is set, a bracket can be found in the fixed field in the frame. As will be explained later, more than one bracket may be present in a single frame.

FIG. 5 illustrates two frames 410, 420 generated, e.g., by a base station, from two packets. In FIG. 5, frame 1 410 has the bracket indicator bit 418 set to be 1, indicating that a bracket is present in the frame. The bracket field 416 is located at the end of the frame in FIG. 5. However, in general, a bracket is in a fixed location, known to both the transmitter and the receiver, in a frame, but not necessarily at the end. The bracket indicator bit 428 in frame 2 420 is zero, indicating no bracket is present 429. In this case, as shown in FIG. 5, the unused bracket field can be used as an extended body portion to carry extra payload in one embodiment of the invention. Hence, the effective body portion when a bracket is absent 424 is larger than that when a bracket is present 414. In another embodiment of the invention, the unused bracket field is used to carry extra overhead information as opposed to payload data. Alternatively, the unused bracket field may be used to communicate a mix of payload data and overhead information.

In general, a frame generated in accordance with the invention carries data bytes that come from zero, one or more packets. For the sake of description, payload data bytes in a frame body belonging to different packets are called blocks and are indexed as 0, 1 and so forth. For purposes of explanation, the bytes of block 0 will be described as always starting from the least significant bit of the frame body, and are immediately followed by blocks 1, 2, . . . , if any. Because of the link layer fragmentation, one packet may be present as blocks in a plurality of successive frames generated in accordance with the invention.

Continuing the example in FIG. 4. Block 0 302' in frame 1 320 comprises data bytes of packet A 302. Packet A 302 is not completed in frame 1 320 and the remaining bytes 302" continue from the beginning of frame 2 322. Bytes of packet A 302 are thus block 0 302" of frame 2 322. Bytes of packet B 304 follow packet A 302 and are thus block 1 304 in frame 2 322.

In accordance with the invention, if the frame body of a frame is completely filled by the data bytes of a single packet (i.e., only block 0 is present in the frame), the bracket indicator bit is set to indicate the bracket is absent. In one embodiment where the bracket field is used by the frame body when the bracket is absent, the frame body and the bracket field are all preferably used by block 0, unless block 0 ends before the end of the frame.

In accordance with the invention, if the frame body of a frame is partially filled by block 0, the bracket indicator bit is set to indicate the bracket is present. In this case, the bracket indicates the ending position of block 0. In addition, the bracket further indicates the following four distinct cases, e.g., types for the corresponding packet boundary.

1. Case 1: There are no other packets in the frame following the packet boundary, and the remaining portion in the frame body, if any, is padded bits. In addition, it is implicitly specified that the next packet always starts with the least significant bit of the frame body, as block 0, in the subsequent frame.
2. Case 2: There is exactly one more packet (i.e., block 1) in the frame following the packet boundary, and block 1 exactly ends at the end of the frame body. In addition, it is implicitly specified that the next packet always starts with the least significant bit of the frame body, as block 0, in the subsequent frame.
3. Case 3: There is exactly one more packet (i.e., block 1) in the frame following the packet boundary, and this additional packet is not completely contained in the frame. That is, this packet starts in the frame as block 1, and has additional bytes to be transmitted in the subsequent frame. The ending position of this packet will therefore not be specified in the current frame.
4. Case 4: There is at least one more packet in the frame following the packet boundary, and the first additional packet, i.e., block 1, does not completely fill the frame. In this case, in addition to the bracket that has been described so far, called the first bracket, there is a second bracket in the frame for block 1. Similar to the first bracket, the second bracket is also located in a fixed position. The usage of the second bracket is the same as the first bracket, except that the second bracket is for block 1 while the first bracket is for block 0. In particular, the second bracket indicates the ending position of block 1 and whether block 2 is present. If block 2 is present, there may be a third bracket for block 2 in the frame. In this way, the packet boundary information is recursively indicated if multiple packets are included in a single frame. In one embodiment, when there are multiple brackets in a frame, the additional brackets (other than the first bracket) occupy part of what would otherwise be the body portion, thereby shortening the effective body portion.

FIG. 6 illustrates several scenarios of frames carrying different numbers of packets in accordance with the invention.

Figure 6A:
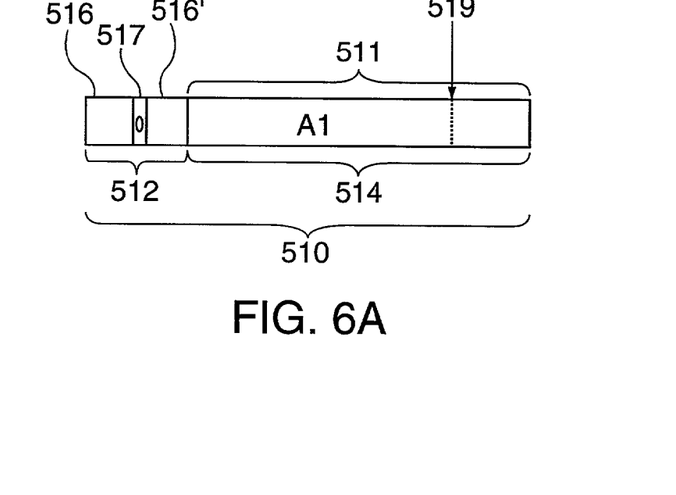

Frame 1 510 includes an overhead portion 512, a body portion 514. Dashed line 519 is used to show where a bracket would have started had one been included. Since the body portion of the frame is filled by data corresponding to a single packet, the bracket is omitted and the bits used to carry a portion of the block A1.

The overhead portion 512 of Frame 1 510 contains a bracket indicator bit 517 and other general overhead bit allocations 516, 516'. Since no bracket is included indicator bit 517 is set to 0. The body portion 514 of Frame 1 510 contains block 0 comprising packet bits A1 511.

Figure 6B:
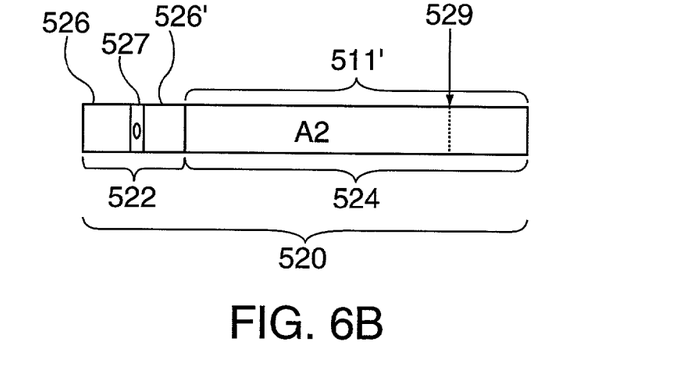

Frame 2 520 includes an overhead portion 522, a body portion 524. In frame 2 the bracket which would normally start at position 529 is omitted. The overhead portion 522 of Frame 2 520 includes a bracket indicator bit 527 and other general overhead bit allocations 526, 526'. As in the case of Frame 1 510, bracket indicator bit 527 is set to 0. The body portion 524 of Frame 2 520 contains block 0 comprising packet bits A2 511'.

Figure 6C:
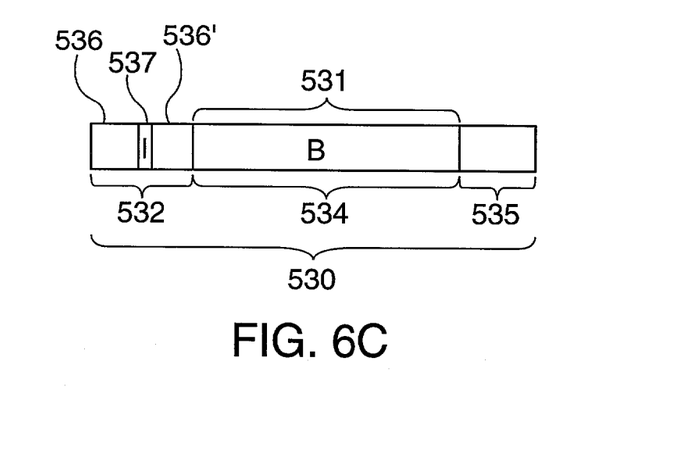

Frame 3 530 includes an overhead portion 532, a body portion 534, and one bracket 535. The overhead portion 532 of Frame 3 530 contains a bracket indicator bit 537 and other general overhead bit allocations 536, 536'. Since a bracket is included in Frame 3 530, bracket indicator bit 537 is set to 1. The body portion 534 of Frame 3 530 includes block 0, which in this case includes 0 Bits resulting in block 0 not being shown, and block 1 comprising Packet B bits 531.

Figure 6D:
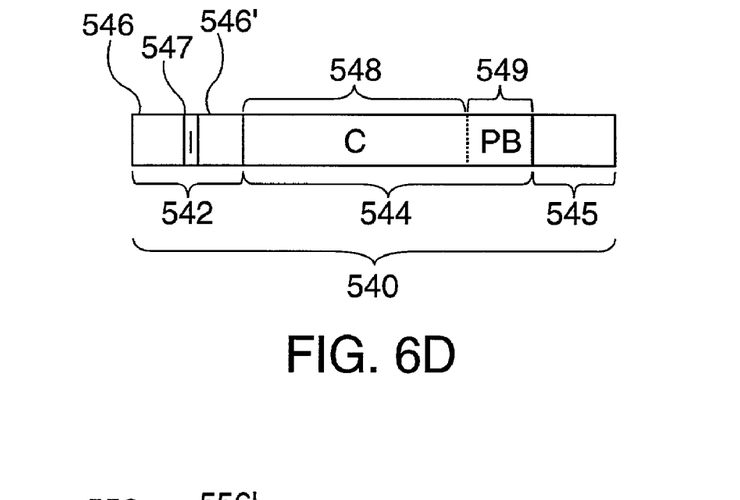

Frame 4 540 includes an overhead portion 542, a body portion 544, and one bracket 545. The overhead portion 542 of Frame 4 540 includes a bracket indicator bit 547 and other general overhead bit allocations 546, 546'. Bracket indicator bit 547 is set to 1 indicating the presence of a bracket in Frame 4 540. The body portion 544 of Frame 4 540 includes block 0 comprising Packet C bits 548, and Padded bits (PB) 549.

Figure 6E:
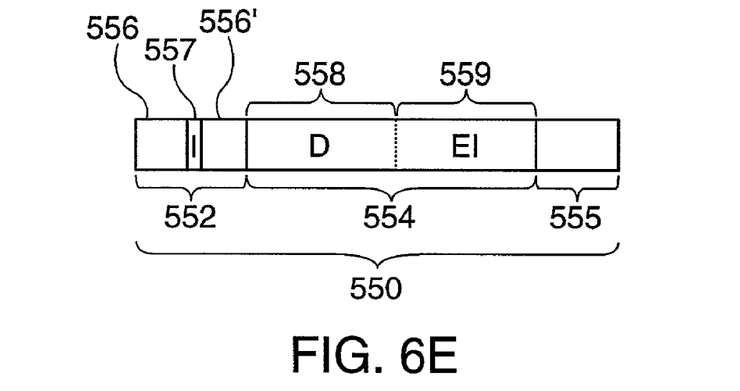

Frame 5 550 includes an overhead portion 552, a body portion 554, and one bracket 555. The overhead portion 552 of Frame 5 550 includes a bracket indicator bit 557 and other general overhead bit allocations 556, 556'. The body portion 554 of Frame 5 550 includes block 0 which comprises Packet D bits 558, and Packet E bits E1 559.

Figure 6F:
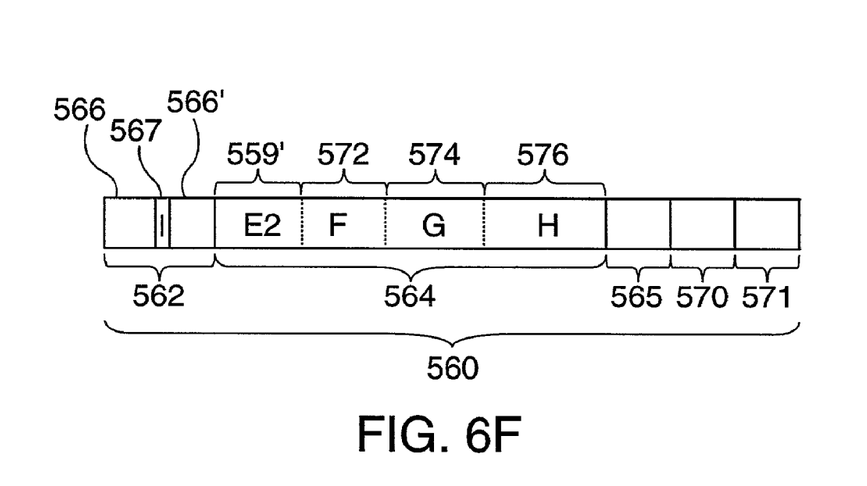

Frame 6 560 includes an overhead portion 562, a body portion 564, and three brackets, the first bracket 571, the second bracket 570, and the third bracket 565. Note that the outermost bracket 571 indicates the end of first set of packet data E2 559', the second outermost bracket 570 indicates the end of the next set of packet data F 527 and so on. Thus, brackets are nested from outside to inside. The overhead portion 562 of Frame 6 560 includes a bracket indicator bit 567 set to 1 and other general overhead bit allocations 566, 566'. The body portion 564 of Frame 6 560 includes block 0 comprising Packet E bits E2 559', Packet F bits 572, Packet G bits 574, and Packet H bits 576.

Successive frames are indexed as frame 1 510, frame 2 520, frame 3 530, frame 4 540, frame 5 550, frame 6 560 and so forth, and are indicated by proper sequence numbers included in accordance with the invention in the overhead portion of the frames. The first packet (packet A bits comprises the combination of packet bits A1 and A2, e.g. concatenated together) starts as block 0 511 of frame 1 510, the first frame after the communication link is just started or reset. Therefore, the beginning position of packet A is implicitly specified. Frames 1 and 2 510, 520 are generated by segmenting Packet A bits and placing the bits A1 and A2 into frames 1 and 2, respectively. A device receiving frames 1 and 2 410, 520 reconstructs Packet A from the received frames by extracting and combining packet bits A1 and A2 to reconstruct Packet A.

Packet A1 bits 511 completely fills the body 514 and there is no bracket field in frame 1 510. Thus, in accordance with the invention, the bracket indicator bit 517 of frame 1 510 is set to indicate the absence of the bracket. Additional Packet A bits A2 511' further exactly fills the body 524 and there is no bracket field in frame 2 520. In accordance with the invention, the bracket indicator bit 527 of frame 2 520 is set to indicate the absence of the bracket. The ending position of packet A is not specified yet in frame 2 520.

Part of Packet A is considered to be block 0 (not shown), though of zero length, in frame 3 530 and the bracket indicator bit 537 of frame 3 530 is set to indicate the presence of the bracket. The bracket 535 of frame 3 530 indicates block 0 is of zero length, thereby indicating the ending position of packet A. The next packet, packet B 531, completely fills the body 534 of frame 3 530. Thus, the bracket 535 of frame 3 530 further indicates "case 2". Hence, the beginning position of packet B is the least significant bit of the body portion 534 and the ending position is the end of the body portion 534. Note that if there is no packet filling the body of frame (not shown), the bracket of frame 3 will be set to indicate "case 1" which is defined above.

Implicitly specified, the next packet, packet C 548, starts with the least significant bit of the frame body, as block 0 548, in the subsequent frame, frame 4 540. Packet C 548 partially fills frame 4 540. Thus, the bracket indicator bit 547 is set to indicate the presence of the bracket. The bracket specifies the ending position of block 0 548, which is packet C in this case.

The bracket further indicates "case 1", meaning that all the remaining bits 549 in the body portion 544 are the padded bits.

Implicitly specified, the next packet, packet D 558, starts with the least significant bit of the frame body 554, as block 0 558, in the subsequent frame, frame 5 550. Packet D 558 partially fills frame 5 550, and is immediately followed by the bits E1 559 of the next packet, packet E (Packet E comprises the combination of packet bits E1 559 and E2 559', e.g. concatenated together). Thus, the bracket indicator bit 557 is set to 1 to indicate the presence of the bracket. The bracket 555 specifies the ending position of block 0 558, which is packet D 558 in this case. The bracket further indicates "case 3", meaning that all the remaining bits E1 559 in the body portion 554 belong to packet E and packet E continues into the next frame, frame 6 560.

Packet bits E2 559' ends in the middle of frame 6 560 and is immediately followed by packets F 572, G 574 and H 576. Thus, the bracket indicator bit 567 is set to indicate the presence of the bracket 571. The bracket 571 specifies the ending position of block 0 559', which is packet E in this case. The bracket further indicates "case 4". In addition to this first bracket 571, there is a second bracket 570 in the frame 560 to specify the ending position of block 1 572, which is packet F 572 in this case. The second bracket 570 further indicates "case 4". Thus, there is a third bracket 565 in the frame 560 to specify the ending position of block 2 574, which is packet G in this case. Packet H fills the remaining portion of the body 564 in frame 6 560 and continues into the next frame, frame 7 (not shown). Thus, the third bracket 565 further indicates "case 3". In frame 6 560, the effective body portion 564 is shortened by 2 bracket fields 570 and 565.

While the bracket(s) are shown in the exemplary figures located at the end of each frame other embodiments are possible. Thus, it is to be understood that the brackets could be located at another position within the frame, e.g., at a fixed offset from the start of the frame while still keeping within the scope of the invention.

The present invention is directed to methods and apparatus for generating frames and packets in the above-described manner. Thus, packetizers and framing circuits are part of the invention. Such packetizers and framing circuits may be implemented in hardware or a combination of hardware and software. The invention is also directed to frames as well as data storage devices including stored frames that have the above described structure. Examples of data storage devices which can be used to store the packets and frames of the present invention include data buffers, disk drives, RAM and other memory devices.

The above described methods and apparatus to the extent that they are new, useful and non-obvious are to be considered the invention.

What is claimed is:

1. An apparatus, said apparatus comprising:
a transmitter module for transmitting a frame; and
a digital data storage device coupled to said transmitter, said data storage device including a frame to be transmitted, said frame comprising:
a packet boundary information indicator used to indicate the presence or absence of a packet boundary information field which indicates a location of a packet boundary within said frame; and
data corresponding to at least a portion of a first packet.

2. An apparatus, said apparatus comprising:
a transmitter module for transmitting a frame; and
a digital data storage device coupled to said transmitter, said data storage device including a frame to be transmitted, said frame comprising:
a packet boundary information indicator used to indicate the presence or absence of a packet boundary information field in said frame;
data corresponding to at least a portion of a first packet; and
a first packet boundary information field that indicates the location within said frame of a first packet boundary.

3. The apparatus of claim 2, wherein the first packet boundary information field further includes packet boundary type information.

4. The apparatus of claim 3,
wherein the packet boundary information indicator is located at a fixed offset from the start of the frame; and
wherein the first packet boundary information field is located at the end of said frame.

5. The apparatus of claim 4, wherein said data corresponding to at least a portion of a first packet is located in said frame between the packet boundary information indicator and said first packet boundary information field.

6. The apparatus of claim 3, wherein said packet boundary type information indicates that said first packet boundary is of a type which is followed by at least one padding bit.

7. The apparatus of claim 3, wherein said packet boundary type information indicates that said first packet boundary is of a type which is followed by data corresponding to one complete packet.

8. The apparatus of claim 3, wherein said packet boundary type information indicates that said first packet boundary is of a type which is followed by data corresponding to a packet only a portion of which is included in said frame.

9. The apparatus of claim 3, wherein said packet boundary type information indicates that said first packet boundary is of a type which is followed by data corresponding to at least one more packet which does not fully fill a data portion of said frame which follows said first packet boundary.

10. The apparatus of claim 2, wherein said first packet boundary information field further indicates the presence of an additional packet boundary in said frame.

11. The apparatus of claim 10, wherein said frame further comprises:
a second packet boundary information field that indicates the location within said frame of a second packet boundary; and
data corresponding to at least a portion of a second packet.

12. The apparatus of claim 11, wherein said frame further comprises:
a third packet boundary information field that indicates the location within said frame of a second packet boundary; and
data corresponding to at least a portion of a third packet.

13. The apparatus of claim 12, wherein said first packet boundary information field is located at the end of the frame.

14. The apparatus of claim 13, wherein the second packet boundary information field is located in said frame immediately preceding said first packet boundary information field.

15. The apparatus of claim 14, wherein the third packet boundary information field is located in said frame immediately preceding said second packet boundary information field.

16. The apparatus of claim 2, wherein said first packet boundary information field indicates that the first packet boundary is followed by padding data.

17. The apparatus of claim 2,
wherein said frame includes an overhead portion and a body portion, said packet boundary indicator being included in said overhead portion indicating that a packet boundary information field is not included in said packet; and said data corresponding to at least a portion of a first packet occupying the entire body portion of said frame.

18. An apparatus, said apparatus comprising:
a transmitter module for transmitting a frame; and
a digital data storage device coupled to said transmitter, said data storage device including a frame to be transmitted, said frame comprising:
a packet boundary information indicator used to indicate the presence or absence of a packet boundary information field which indicates a location of a packet boundary within said frame; and
data corresponding to at least a portion of a first packet; and
wherein said packet boundary information field indicator is a single bit.

19. The apparatus of claim 18, wherein said packet boundary information field indicator bit is located at a fixed offset from the start of the frame.

20. A method of communicating data packets, comprising:
generating a frame including:
i) a packet boundary information indicator used to indicate the presence or absence of a packet boundary information field which indicates a location of a packet boundary within said frame; and
ii) data corresponding to at least a portion of a first one of said received data packets.

21. A method of communicating data packets, comprising:
generating a frame including:
i) a packet boundary information indicator used to indicate the presence or absence of a packet boundary information field in said frame;
ii) data corresponding to at least a portion of a first one of said received data packets; and
iii) a first packet boundary information field in said frame that indicates the location within said frame of a first packet boundary.

22. A method of communicating data packets, comprising:
operating a first communications device to generate a frame including:
i) a packet boundary information indicator used to indicate the presence or absence of a packet boundary information field in said frame; and
ii) data corresponding to at least a portion of a first one of said received data packets;
operating the first communications device to transmit said frame to a second communications device;
operating the second communications device to examine the packet boundary information indicator included in said frame to determine whether a packet boundary information field is included in said frame; and
when it is determined that a packet boundary information field is included in said frame, extracting said packet data from said frame as a function of the information included in said packet boundary information field.

23. The communications method of claim 22, further comprising the step of:
reconstructing a packet using packet data extracted from the transmitted frame and a previously transmitted frame by concatenating said extracted packet data with packet data extracted from a previously transmitted frame.

24. The communications method of claim 21, wherein said step of generating a frame further includes:
including packet boundary type information in said first packet boundary information field.

25. The communications method of claim 24, wherein the packet boundary type information indicates that the packet boundary is of a type which is followed by padding data.

26. The communications method of claim 24, where said step of generating a frame further includes:
locating said packet boundary information indicator at a fixed offset from the start of said frame.

27. The communications method of claim 26, wherein said step of generating a frame further includes:
locating said first packet boundary information field at the end of the frame.

28. The method of claim 21, wherein the step of generating a frame further includes:
including a second packet boundary information field that indicates the location within said frame of a second packet boundary; and
including data corresponding to at least a portion of a second packet following said second packet boundary.

29. The method of claim 28, wherein the step of generating a frame further includes:
including a third packet boundary information field that indicates the location within said frame of a third packet boundary; and
including data corresponding to at least a portion of a third packet following said third packet boundary.

30. The method of claim 29, wherein said packet boundary information field indicator is a single bit; and
wherein said first packet boundary information field includes a two bit indicator specifying the packet boundary type.

31. A communication system comprising:
a first communications device including:
means for generating frames from packets each generated frame including:
i) a packet boundary information indicator used to indicate the presence or absence of a packet boundary information field which indicates a location of a packet boundary within said frame and ii) data corresponding to at least a portion of one of said packets; and
means for storing said generated frames.

32. A communication system comprising:
a first communications device including:
means for generating frames from packets each generated frame including:
i) a packet boundary information indicator used to indicate the presence or absence of a packet boundary information field in said frame and ii) data corresponding to at least a portion of one of said packets;
means for storing said generated frames; and
wherein said means for generating from packets includes:
means for including a first packet boundary information field in said frame that indicates the location within said frame of a first packet boundary.

33. The communication system of claim 32, wherein said means for generating from packets includes:
means for including packet boundary type information in said first packet boundary information field.

34. The communication system of claim 33, wherein the first communications device further includes:
a transmitter for transmitting said frame.

35. The communication system of claim 34, further comprising:
a second communications device including:
i) a receiver for receiving transmitted frames; and
i) means for examining the packet boundary information indicator included in a received frame to determine whether a packet boundary information field is included in said frame; and
iii) packet data extraction means for extracting said packet data from said frame as a function of the information included in said packet boundary information field of said received frame.

36. The communication system of claim 35, wherein said second communication device further includes:
means for reconstructing a packet using packet data extracted from the received frame and a previously received frame by concatenating said extracted packet data with packet data extracted from the previously received frame.

37. An apparatus including a processor configured to control said apparatus to implement a communications method, the communications method comprising:
generating a frame including:
i) a packet boundary information indicator used to indicate the presence or absence of a packet boundary information field in said frame;
ii) data corresponding to at least a portion of a first one of said received data packets; and
iii) a first packet boundary information field in said frame that indicates the location within said frame of a first packet boundary; and
transmitting said frame to another device.

38. A computer readable medium embodying machine executable instructions for controlling a device to implement a method, the method comprising:
generating a frame including:
i) a packet boundary information indicator used to indicate the presence or absence of a packet boundary information field in said frame; and
ii) data corresponding to at least a portion of a first one of said received data packets
iii) a first packet boundary information field in said frame that indicates the location within said frame of a first packet boundary; and
storing said generated frame prior to transmission.

39. An apparatus, said apparatus comprising:
means for transmitting a frame; and
means for storing frames coupled to said transmitter, said means for storing frames including a stored frame to be transmitted, said stored frame comprising:
a packet boundary information indicator used to indicate the presence or absence of a packet boundary information field which indicates a location of a packet boundary within said frame; and
data corresponding to at least a portion of a first packet.

40. An apparatus, said apparatus comprising:
means for transmitting a frame; and
means for storing frames coupled to said transmitter, said means for storing frames including a stored frame to be transmitted, said stored frame comprising:
a packet boundary information indicator used to indicate the presence or absence of a packet boundary information field in said frame;
data corresponding to at least a portion of a first packet; and
a first packet boundary information field that indicates the location within said frame of a first packet boundary.

41. The apparatus of claim 40, wherein the first packet boundary information field further includes packet boundary type information.

* * * * *